United States Patent

Nash

[11] Patent Number: 5,984,057
[45] Date of Patent: Nov. 16, 1999

[54] ROTARY DAMPERS

[75] Inventor: John Valentine Nash, Surrey, United Kingdom

[73] Assignee: Kinetrol Limited, Farnham, United Kingdom

[21] Appl. No.: 08/921,146

[22] Filed: Aug. 29, 1997

[30] Foreign Application Priority Data

Sep. 4, 1996 [GB] United Kingdom ............... 96181468

[51] Int. Cl.⁶ .......................... F16D 57/00; F16D 57/02
[52] U.S. Cl. ................................. 188/290; 188/293
[58] Field of Search ...................... 188/290, 293, 188/266.3

[56] References Cited

U.S. PATENT DOCUMENTS

| | | | |
|---|---|---|---|
| 3,861,503 | 1/1975 | Nash | 188/290 X |
| 4,565,266 | 1/1986 | Omata | 188/290 X |
| 4,830,151 | 5/1989 | Numata | 188/290 |
| 5,211,267 | 5/1993 | Clark | 188/290 X |
| 5,269,397 | 12/1993 | Kawamoto et al. | 188/290 |
| 5,522,485 | 6/1996 | Takahashi et al. | 188/290 X |

FOREIGN PATENT DOCUMENTS 2 288 450  10/1995  United Kingdom .

*Primary Examiner*—Christopher P. Schwartz
*Assistant Examiner*—Jeffrey Woller
*Attorney, Agent, or Firm*—Jones, Tullar & Cooper, P.C.

[57] ABSTRACT

A rotary damper has an inner member located within an outer member and an annular seal between the members enclosing a fluid-filled space bounded in part by mutually adjacent faces of the members. A viscous damping force is thereby generated by relative rotation of the members. The seal has a radially inner rim in sliding engagement with the inner member. A resilient flexible retainer held by the outer member bears on the seal inner rim, flexure of the retainer providing a predetermined axial sealing pressure on the rim. The seal includes a diaphragm portion exposed to atmospheric pressure and deformable to accommodate thermal expansion of the fluid in the sealed space.

15 Claims, 1 Drawing Sheet

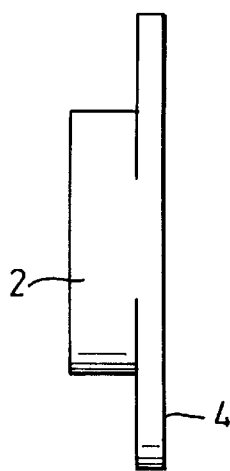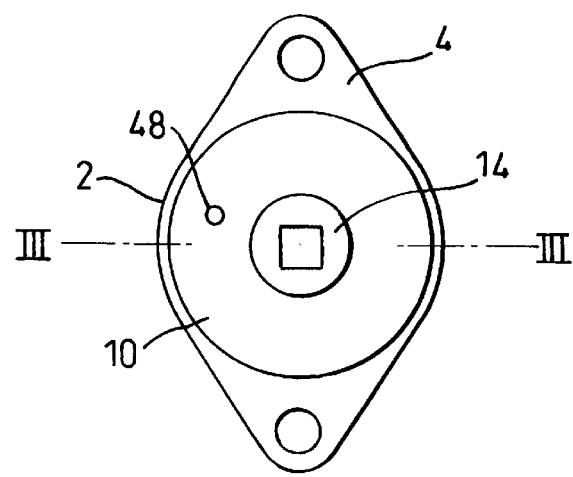
Fig. 1   Fig. 2
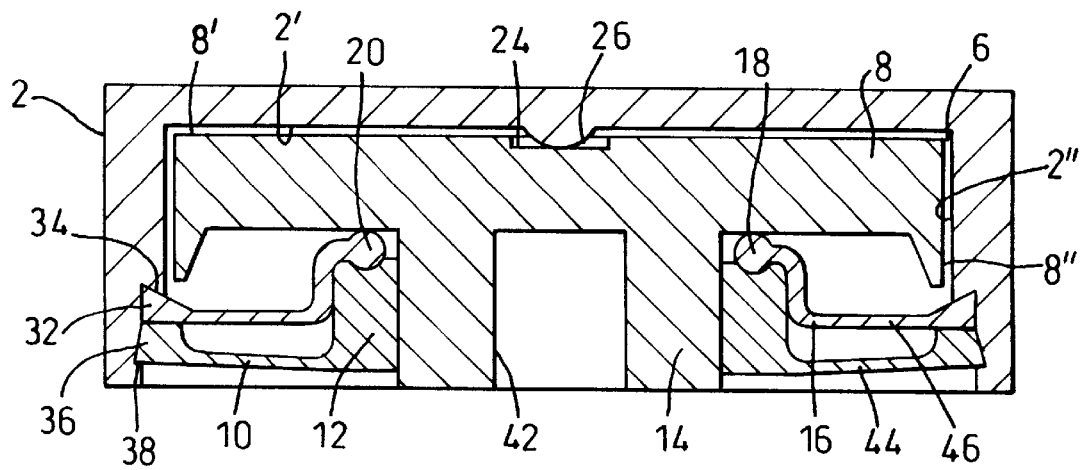
Fig. 3
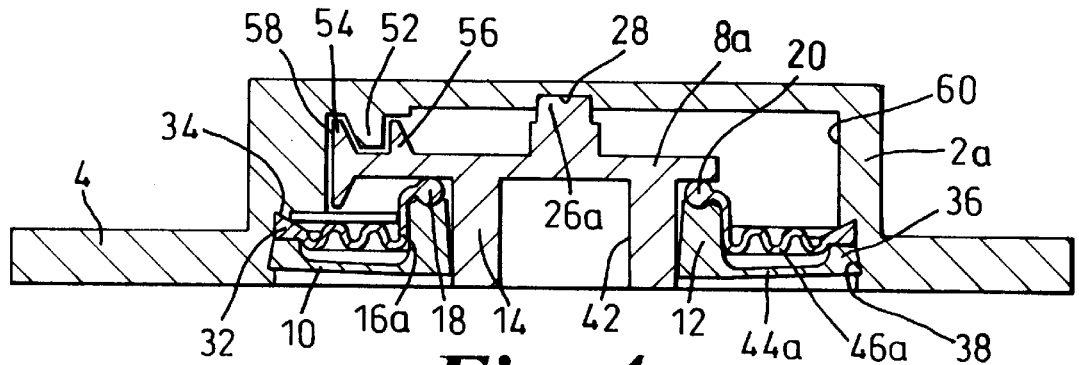
Fig. 4

ROTARY DAMPERS

BACKGROUND OF THE INVENTION

This invention relates to fluid-filled rotary dampers, in which a damping force is generated between two relatively rotatable parts by viscous friction in a fluid filling a space between the parts.

Fluid-filled dampers arranged for continuous rotation require a sliding or dynamic seal to retain the fluid within the damper. If, as is common, the seal is provided by an O-ring, for reliable sealing that O-ring is held under compression between inner and outer radial faces. This has the disadvantage that the pressure on the O-ring generates a significant sliding friction force when rotation occurs, and the level of that force tends to be unpredictable. It is possible to avoid the problem by using instead a moulded lip seal, but that is a relatively expensive solution.

SUMMARY OF THE INVENTION

According to one aspect of the present invention, there is provided a rotary damper comprising a pair of relatively rotatable members having mutually adjacent faces defining between them a fluid-filled space, in which a viscous damping force is generated by the relative rotation of the members, said space being sealed from the exterior by a seal between the members having an annular portion in sliding engagement with one of the members, said portion being sandwiched between said one member and a resiliently flexible retainer that is deformed to apply to said annular portion a predetermined sealing pressure axially of said relative rotation.

The retainer can have an annular edge portion radially spaced from its bearing engagement with said seal portion located on the other of the relatively rotatable members and engaged with that other member, conveniently by a snap fit. The retainer may also comprise a bearing element slidably contacting said one member to locate the relatively rotatable members radially with respect to each other.

Preferably said annular portion of the seal engaging one of the members forms a radially inner portion of a generally annular seal including a web between inner and outer annular portions in engagement with the respective relatively rotatable members, said web being deformable to compensate for thermal expansion of the fluid sealed into the damper. For this purpose, the web can be arranged internally of the retainer with at least a portion normally spaced therefrom.

In another preferred feature, the mutually adjacent faces of the relatively rotatable members have their spacing set by contact between integral portions of the two members at or near the axis of rotation.

In a more specific form of the invention, the rotary damper comprises inner and outer members, the inner member being located within the outer member and an annular seal between the two members enclosing a fluid-filled space bounded by mutually adjacent faces of the respective members whereby a viscous damping force is generated by relative rotation of the members, the seal comprising a radially inner rim in sliding engagement with the inner member, said rim being sandwiched between said inner member and a resiliently flexible retainer held by the outer member to be deformed against said inner rim in order to apply a predetermined sealing pressure axially thereto, a diaphragm portion of the seal having an outer face exposed to atmospheric pressure and being deformable to accommodate thermal expansion of the fluid in said space.

An example of the invention will be described in more detail with reference to the accompanying drawings.

BRIEF DESCRIPTION OF THE DRAWINGS

FIGS. 1 and 2 are mutually transverse views on a continuous rotation damper according to the invention, FIG. 3 is a section on the line III—III in FIG. 2, and FIG. 4 is a section similar to FIG. 3 illustrating some modifications of the damper.

DESCRIPTION OF THE PREFERRED EMBODIMENTS

The damper illustrated in FIGS. 1–3 has a pot-shaped outer body member 2 with integral flanges 4 and a cylindrical interior 6 into which a cylindrical inner member 8 fits concentrically. The inner member 8 is located radially within the outer member 2 by a flexible annular retainer 10 which has an inner rim 12 the inner cylindrical face of which engages an integral collar 14 of the inner member with a free sliding fit.

An annular elastomer seal 16 is located between the retainer 10 and the inner member 8. A bead 18 forming the inner periphery of the seal 16 is located in a recess 20 in the rim 12 of the retainer and is held against the inner member 8 with a small compression force applied by the retainer 10 axially of the inner and outer body members. The compression force also urges a recessed end face 24 of the inner member into contact with a central part-spherical boss 26 on the opposed face of the outer member 2.

Thickened outer bead 32 of the annular seal 16 is located against a shoulder 34 in the inner cylindrical face of the outer member 2 and the outer periphery 36 of the retainer 10 is snap-fitted into a recess 38 in that cylindrical face, engaging the seal outer band 32 and so holding the inner member and seal in the position shown. The interior space 6 bounded by the seal 16 is filled with a damping fluid so that, when relative rotation occurs between the two members 2, 8 about their common central axis, a viscous damping force is generated between the closely spaced end faces 2', 8' of the two members, and also between their closely spaced cylindrical faces 2", 8". The damper can be secured to two members (not shown) of a mechanism whose relative rotation is to be controlled through the flanges 4 of the outer member and through the polygonal socket 42 formed centrally in the collar 14 of the inner member.

The location of the inner member 2 against the part-spherical boss 26 by the reaction from the axial loading applied to the seal 16 defines an accurate gap between the end faces of the two members, so giving a well defined torque between the two members making for predictable performance of the damper.

The inner and outer members 2,8 are made of a rigid plastics material such as Delrin (Du Pont (UK) Ltd), having the property of dimensional stability under moderate load. The annular retainer 10 is made of a similar material but because it incorporates a thin-walled formation 44 between inner rim 12 and outer periphery 36 it is able to flex relatively easily in reaction to the force between the rim 12 and the seal bead 18. The force applied to the seal bead is therefore predictable and the friction forces generated can be kept low.

The seal 16 is made of a resilient elastomer such as a polyurethane which is much less stiff so that an intermediate diaphragm portion 46 between the inner and outer beads 16,32 is readily flexed if there is thermal expansion or contraction of the fluid within the damper. The thin-walled formation 44 of the retainer has at least one aperture so that atmospheric pressure prevails on the outer face of the seal.

Static and dynamic sealing can be assured for prolonged periods of service with this sealing arrangement. Other notable features of the illustrated example are the small number of parts required and the ease of assembly of the damper.

FIG. 4 illustrates a modified form of the damper described with reference to FIGS. 1–3. Parts already referred to in those figures are indicated by the same reference numbers.

The damper of FIG. 4 is designed to give a non-uniform damping rate as the inner and outer members 8a,2a rotate relative to each other. This is obtained by providing the two members with intermeshing toothing segments 52,54,56 extending in an arc only part of the way, eg. 90°, around the central axis of the damper. The fluid in the narrow spaces between the tooth 52 in the outer member and the teeth 54,56 in the inner member thus generates a damping force over only part of each full revolution of the damper. An additional, uniform damping force is obtained from the fluid in the narrow gap between the part-cylindrical face 58 of the inner member 8a and the cylindrical face 60 of the outer member 2a.

Because the toothing 52,54,56 generates asymmetrical damping forces, the central bearing between the inner and outer members 2a,8a is also modified, with a cylindrical boss 26a on the inner member in a complementary recess 28 of the outer member able to resist tilting moments.

FIG. 4 also shows a modified elastomer seal, equally applicable to the embodiment of FIGS. 1–3, which has a corrugated web 46a to allow it to flex more freely in response to changes of atmospheric pressure.

In all other respects, the damper of FIG. 4 can correspond to the damper of FIGS. 1–3.

I claim:

1. A rotary damper comprising a pair of relatively rotatable members, mutually adjacent faces of the members defining between them a fluid-filled space for the generation of a viscous damping force by the relative rotation of the members, a seal between the members sealing said space from the exterior, an annular portion of said seal being in sliding engagement with one of the members, a resiliently flexible retainer having a bearing engagement with said portion to sandwich said portion between said one member and said retainer, said bearing engagement of the resiliently flexible retainer on said seal portion being arranged to deform said retainer and thereby to apply to said annular portion of the seal a predetermined sealing pressure axially of the direction of relative rotation.

2. A rotary damper according to claim 1, wherein the resiliently flexible retainer comprises an annular edge portion radially spaced from said bearing engagement with said seal annular portion, said annular edge portion being located on the other of the relatively rotatable members and engaged therewith.

3. A rotary damper according to claim 2 wherein a snap fit between said annular edge portion and said other member provides the engagement of the annular edge region.

4. A rotary damper according to claim 2 wherein the retainer comprises a bearing element slidably contacting said one member to locate the relatively rotatable members radially with respect to each other.

5. A rotary damper according to claim 1 wherein the seal has a generally annular configuration and the seal annular portion engaging said one member forms a radially inner portion of said configuration, the seal further comprising a radially outer annular portion in engagement with the other of said relatively rotatable members and a web between said inner and outer annular portions, said web being deformable to compensate for thermal expansion of the fluid sealed in said space in the damper.

6. A rotary damper according to claim 5 wherein the web is disposed internally of the retainer and has at least a portion spaced therefrom.

7. A rotary damper according to claim 1 wherein the relatively rotatable members have integral portions at or near an axis of relative rotation and said integral portions are in contact to set a spacing between said mutually adjacent faces of the members.

8. A rotary damper according to claim 1 wherein the relatively rotatable members comprise arcuate faces located adjacent each other during part of a full revolution in the relative rotation of the members, whereby to generate a varying damping force.

9. A rotary damper comprising relatively rotatable inner and outer members, the inner member being located within the outer member and an annular seal between the two members enclosing a fluid-filled space within the damper, the respective members having mutually adjacent faces bounding said space for the generation of a viscous damping force by the relative rotation of the members, the seal comprising a radially inner rim in sliding engagement with the inner member, a resiliently flexible retainer held by the outer member having a portion in bearing engagement with said rim to sandwich the rim between said inner member and said retainer, said bearing engagement of said portion of the resiliently flexible retainer against the said inner rim of the seal producing a deformation of the retainer whereby a predetermined sealing pressure is applied to said inner rim axially of the direction of rotation, the seal further comprising a diaphragm portion having an outer face exposed to atmospheric pressure, said diaphragm portion being deformable to accommodate thermal expansion of the fluid in the said space.

10. A rotary damper according to claim 9 wherein the retainer comprises a bearing element slidably contacting said one member to located the relatively rotatable members radially with respect to each other.

11. A rotary damper according to claim 9 wherein the relatively rotatable members have integral portions at or near an axis of relative rotation and said integral portions are in contact to set a spacing between said mutually adjacent faces of the members.

12. A rotary damper according to claim 9 wherein the relatively rotatable members comprise arcuate faces located adjacent to each other during part of a full revolution in the relative rotation of the members, whereby to generate a varying damping force.

13. A rotary damper comprising a pair of relatively rotatable members, mutually adjacent faces of the members defining between them a fluid-filled space for the generation of a viscous damping force by the relative rotation of the members, a seal between the members sealing said space from the exterior, an annular portion of said seal and an annular face of one of the members being in sliding engagement with each other, a resiliently flexible retainer having a face opposite said member annular face in bearing engagement with said portion to sandwich said portion between said member face and said retainer face, said bearing engagement of the resiliently flexible retainer on said seal portion being arranged to deform said retainer and thereby to apply to said annular portion of the seal a predetermined sealing pressure axially of the direction of relative rotation.

14. A rotary damper comprising a pair of relatively rotatable members, mutually adjacent faces of the members defining between them a fluid-filled space for the generation of a viscous damping force by the relative rotation of the members, a seal between the members sealing said space from the exterior, the seal having a generally annular configuration, comprising a radially inner annular portion in sliding engagement with one of the members, a radially outer annular portion in engagement with the other of the members, and a web between said inner and outer portions, said web being deformable to compensate for thermal expansion of the fluid sealed in said space, a resiliently flexible retainer having a bearing engagement with said portion to sandwich said radially inner portion between said one member and said retainer, said bearing engagement of the resiliently flexible retainer on said seal portion being arranged to deform said retainer and thereby to apply to said annular portion of the seal a predetermined sealing pressure axially of the direction of relative rotation.

15. A rotary damper according to claim 14 wherein the web is disposed internally of the retainer and has at least a portion spaced therefrom.

\* \* \* \* \*